(12) United States Patent
Kursun (10) Patent No.: US 10,325,104 B1
(45) Date of Patent: *Jun. 18, 2019

(54) SYSTEMS AND METHODS FOR DATA SHARING AND TRANSACTION PROCESSING FOR HIGH SECURITY DOCUMENTS

(71) Applicant: JPMorgan Chase Bank, N.A., New York, NY (US)

(72) Inventor: Eren Kursun, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,487

(22) Filed: Jul. 20, 2017

Related U.S. Application Data

(62) Division of application No. 14/176,977, filed on Feb. 10, 2014, now Pat. No. 9,747,460.

(60) Provisional application No. 61/928,917, filed on Jan. 17, 2014.

(51) Int. Cl.
*G06F 21/62* (2013.01)

(52) U.S. Cl.
CPC .......... *G06F 21/62* (2013.01); *G06F 21/6209* (2013.01); *H04L 2209/463* (2013.01)

(58) Field of Classification Search
CPC ............. H04L 2209/463; H04L 63/101; G06F 21/6209; G06Q 30/0637
See application file for complete search history.

(56) References Cited

U.S. PATENT DOCUMENTS

| | | | |
|---|---|---|---|
| 7,149,893 B1 | 12/2006 | Leonard | |
| 9,747,460 B1* | 8/2017 | Kursun | G06F 21/62 |
| 9,779,445 B1* | 10/2017 | Hoberman | G06Q 30/0637 |
| 2002/0095432 A1 | 7/2002 | Shimomura | |
| 2002/0099938 A1* | 7/2002 | Spitz | H04L 9/3247 |
| | | | 713/155 |
| 2002/0169954 A1 | 11/2002 | Bandini et al. | |
| 2004/0255147 A1 | 12/2004 | Peled et al. | |
| 2006/0173698 A1* | 8/2006 | Morley | G06F 17/30507 |
| | | | 705/7.36 |
| 2007/0074270 A1 | 3/2007 | Meehan | |
| 2008/0060080 A1 | 3/2008 | Lim | |
| 2008/0249816 A1 | 10/2008 | Khalilian | |
| 2009/0063240 A1* | 3/2009 | Pallari | G06Q 10/06 |
| | | | 705/7.15 |
| 2009/0327294 A1 | 12/2009 | Bailor | |
| 2011/0119771 A1 | 5/2011 | Postoyko | |
| 2011/0137947 A1 | 6/2011 | Dawson | |
| 2011/0138175 A1 | 6/2011 | Clark | |
| 2011/0307408 A1 | 12/2011 | Gates | |

(Continued)

*Primary Examiner* — David J Pearson
(74) *Attorney, Agent, or Firm* — Hunton Andrews Kurth LLP (57) ABSTRACT

Systems and methods for data sharing and transaction processing for high security documents are disclosed. According to one embodiment, a method may include (1) at least one computer processor verifying that a sender of a document is authorized to send the document; (2) the at least one computer processor verifying that a receiver of the document is authorized to receive the document; (3) the at least one computer processor identifying at least one restriction to associate with the document; and (4) the at least one computer processor associating the at least one restriction with the document.

18 Claims, 6 Drawing Sheets

(56) References Cited

U.S. PATENT DOCUMENTS

2013/0212707 A1    8/2013   Donahue et al.
2013/0254837 A1    9/2013   Brannon et al.
2015/0199533 A1    7/2015   Chou Fritz

* cited by examiner

SYSTEMS AND METHODS FOR DATA SHARING AND TRANSACTION PROCESSING FOR HIGH SECURITY DOCUMENTS

RELATED APPLICATIONS

This application is a Division of U.S. patent application Ser. No. 14/176,977, now U.S. Pat. No. 9,747,460, filed Feb. 10, 2014, which claims the benefit of U.S. Provisional Patent Application Ser. No. 61/928,917, filed Jan. 17, 2014, the disclosure of each of which is hereby incorporated, by reference, in its entirety.

BACKGROUND OF THE INVENTION

1. Field of the Invention

The present invention generally relates to electronic communications, and, more particularly, to systems and methods for data sharing and transaction processing for high security documents.

2. Description of the Related Art

Documents are often shared with meeting participants on their mobile electronic devices, such as tablet computers (e.g., iPad, Samsung Galaxy, etc.), notebook computers, etc. They can be shared, for example, by email, or by RF technology (e.g., Bluetooth, NFC). Currently, there is little control over the documents that are distributed to meeting participants.

SUMMARY OF THE INVENTION

Systems and methods for data sharing and transaction processing for high security documents are disclosed.

Methods for data sharing are disclosed. According to one embodiment, a method may include (1) at least one computer processor verifying that a sender of a document is authorized to send the document; (2) the at least one computer processor verifying that a receiver of the document is authorized to receive the document; (3) the at least one computer processor identifying at least one restriction to associate with the document; and (4) the at least one computer processor associating the at least one restriction with the document.

According to one embodiment, the method may further include the at least one computer processor verifying that transmission of the document is authorized; the at least one computer processor verifying that the sending device is authorized to send the document; and the at least one computer processor verifying that the receiving device is authorized to receive the document.

In one embodiment, the step of verifying that a sender of a document is authorized to send the document may include the at least one computer processor checking an authorization table to see if the sender is authorized to send the document.

In one embodiment, the step of verifying that transmission of the document is authorized may include the at least one computer processor identifying any restrictions on the transmission of the document. The verification may be based on at least one of a size of the document, a type of the document, a level of security for the document, and a physical location of the document.

In one embodiment, the step of verifying that the sending device is authorized to send the document may include the at least one computer processor verifying that the sending device is associated with the sender.

In one embodiment, the step of verifying that the receiving device is authorized to receive the document may include the at least one computer processor verifying that the receiving device is associated with the receiver.

In one embodiment, the restriction to associate with the document may include one or more of a transmission restriction, a printing restriction, an access restriction, a geographical restriction, and a document expiration.

In one embodiment, the method may further include at least one computer processor on the receiving device enforcing the restriction.

According to another embodiment, a method for data sharing may include (1) receiving, at a sending electronic device, a request to send a document to a receiver; (2) at least one computer processor at the sending electronic device requesting authorization from a server to send the document to a receiving electronic device, the request comprising an identification of the receiving electronic device and of the document; (3) receiving, at the electronic device, authorization from a server to send the document to the receiving electronic device; and (4) the at least one computer processor sending the document to the receiver.

In one embodiment, the method may further include the at least one computer processor establishing a communication link with a receiving electronic device. In one embodiment, the communication link may be a direct communication link between the sending receiving device and the receiving electronic device.

In one embodiment, the method may further include the at least one computer processor receiving at least one restriction to associate with the document; and the at least one computer processor associating the at least one restriction with the document.

According to another embodiment, a method for data sharing may include (1) at least one computer processor at a sending device updating local memory with authorization information for a plurality of documents and a plurality of receivers; (2) receiving, at a sending electronic device, a request to send a document to one of the receivers; (3) the at least one computer processor at the sending electronic device verifying with the local memory that it is authorized to send the document to the receiver; and (4) the at least one computer processor sending the document to the receiver.

According to another embodiment, a method for data sharing may include (1) receiving, at a receiving electronic device, a document and at least one restriction associated with the document; and (2) at least one computer processor at the receiving electronic device enforcing the at least one restriction. In one embodiment, the restriction may restrict transmission of the document from the receiving electronic device. In another embodiment, the restriction may restrict the printing of the document from the receiving electronic device. In still another embodiment, the restriction may cause the document to be deleted upon the occurrence of an event. In yet another embodiment, the restriction may restrict access to the document based on a location of the receiving electronic device.

According to another embodiment, a method for transaction approval may include (1) receiving, at a first electronic device, a request for approval of a transaction, the request identifying the transaction and a plurality of approvers in an approval hierarchy; (2) at least one computer processor at the first electronic device establishing a first communication link with a second electronic device; (3) the at least one computer processor sending the request for approval to the second electronic device over the first communication link; (4) the at least one computer processor receiving approval from the second electronic device; (5) the at least one computer processor at the first electronic device establishing a second communication link with a third electronic device; (6) the at least one computer processor sending the request for approval to the third electronic device over the second communication link; and (7) the at least one computer processor receiving approval from the third electronic device.

In one embodiment, a controller that regulates the communication in and out of the mobile device based on a matrix of rules and regulations for the specific point in time is disclosed. The communication may include file sharing, collaboration, messaging, joint actions, approval chains etc. The communication may be between two parties, among multiple parties (e.g., one to many, many to many,).

In one embodiment, the controller may regulate file or document access, edit, share restrictions, etc. The controller may also regulate the communication of any data in or out of the device.

In one embodiment, the controller may restrict and control the communication, sharing of files and/or actions, etc. based on a matrix that may identify applicable rules, regulations, policies, etc. for the specific point in time through hardware level access to the communication channel blocks.

In one embodiment, hardware controller apparatuses that functions as a communication controller, hardware/software coordinated NFC controller, etc. are disclosed.

In one embodiment, the controller may place and/or enforce restriction rules on the communicated files, user or device actions, storage, etc. of data based on the agreement with the server back-end and receiving parties.

In one embodiment, the controller may automatically communicate with nearby devices and may perform checks for communication, file transfer or other actions.

Methods to codify enterprise policies or restrictions (e.g., document access, communication restrictions, storage restrictions, etc.) into the rules in the machine readable controller instructions are disclosed.

In one embodiment, the matrix of rules, restrictions, guidelines, policies, etc. may be described and executed at a specified time.

In one embodiment, the matrix may be dynamically maintained and updated.

In one embodiment, the restrictions, rules/guidelines, etc. regarding end users, files, devices, departments and other communication may be linked to the individual instances and the corresponding profiles.

In one embodiment, a mobile device is disclosed. The mobile device may include a User/Device Profile, a restriction matrix cache, and a communication controller. In one embodiment, the user/device profile may specify the user's role, file ownership, sharing privileges, access profile, department/group/organization profiles etc. The restriction matrix cache may maintain a cache of the rules/regulations (e.g., laws, regulations, organizational policies, restrictions (e.g., need-to-know based restrictions, etc.), recent file access and communication decisions for the specific user for the specific device. The communication controller may communicate and coordinate with a back-end server, storage, etc. to coordinate the decision for each file transfer, communication, collaboration, etc. for the given point in time. In one embodiment, the system is dynamic and does not rely solely on static tables, but on dynamic information as well. The communication controller may also communicate and coordinate with the back-end server with any changes or updates (e.g., file access permission change, etc.), any actions for future reference, etc. The communication controller may also communicate and coordinate to the receiving party and other parties the rules and restrictions of the exchange (e.g., cross checking the restrictions on both ends).

The communication controller may also communicate using a protocol that may specify the exchange, rules, restrictions. It may also create a dedicated channel for trusted team communications, file sharing, transaction approvals (also coordinates the channel with the server side).

Methods for processing transactions or actions by multiple parties through the shared trusted channel are disclosed.

Communication protocols that automatically check the communication, file exchange, transactions for the specified time periods (through NFC, Wi-Fi, data connection, Ethernet or any other networking channel) are disclosed.

Methods of using a user restriction table that specifies restrictions, communication rules and guidelines for the specific user and between the specified user and other entities are disclosed.

Methods of using a file access restriction table, that specifies the sharing/resharing restrictions, expiration date for the document, restrictions on access editing, etc. are disclosed.

Methods of using a dynamic restriction matrix that specifies the restrictions among groups, departments, external entities, document types, device type, communication channel type, temporal restrictions, etc. are disclosed.

A server (e.g., a back-end server) is disclosed that may include a controller, a dynamic matrix that may identify all communication restrictions at various levels of granularity (between users, between departments, between companies etc.) is disclosed. The restrictions may further be associated with a temporal guideline that may specify when the restriction starts, what is restricted, when the restriction ends, who is restricted, etc. A history table may further store the communication patterns of restricted files (or sensitive documents) or controller actions (trading, transactions, etc.)

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-6, wherein like reference numerals refer to like elements.

Technologies that exist in most mobile electronic devices (e.g., tablet computers, notebook computers, smart phones, etc.) enable easy sharing of documents between different devices. Documents are often shared among electronic devices by email, local RF communication (e.g., Near Field Communication, Bluetooth, etc.) before or during meetings with essentially no restrictions on future sharing, retention, etc. In high security environments, such as banking, legal, research and development, etc., the ease of transferring files may create security challenges.

Embodiments of the invention relate to the secure sharing of documents among meeting participants. In one embodiment, an software application or program that runs on the meeting participants' electronic devices (e.g., table computers, notebook computers, smartphones, etc.) may control the transmission and reception of a secure document, and may further enforce restrictions (e.g., sharing, printing, auto-deletion, etc.) on the document. For example, a software application or program on the sender's mobile device may verify that the sender is authorized to access the document and to share the document with others. The software application may also verify that the receiver of the document is authorized to receive the document before the document is sent. A corresponding software application on the receiver's device may perform the same checks.

Both the software application on the sending device and the receiver device may verify that sharing the document is not contrary to any document restrictions that prevent the sharing of the document.

The software applications on the sending and receiving devices may enforce document restrictions on the document. For example, the software applications may enforce any restrictions on sharing the document. In another embodiment, the software applications may cause the document to be deleted, have reduced functionality (e.g., cannot be printed, accessed, edited, etc.), or have any other suitable restrictions. In one embodiment, a document received on the receiver's device may have at least the same restrictions on the document that was provided by a sender. The receiving software application may further cause the document to be deleted at the conclusion of the meeting, after a period of time, etc.

The sending and receiving software applications may verify the authority of the sender and the receiver against a database that may be stored on a server. Certain senders and receivers, such as those within the same project team, may be pre-registered and may only require periodic verification.

The verification may be based on, for example, job descriptions, file and access restrictions/privileges, project associations, internal "walls" and restrictions, device restrictions, and any dynamic/temporal restrictions on the file.

For receiving devices that do not have the software application, the sending device may verify the identity of the receiving device by certificate, device identifier, etc. against a database of registered devices. If verified, the receiving device may be provided with a restricted document, a link to a network location that hosts the document, etc.

In one embodiment, a similar system may be implemented on a server, whereby all communications within an organization may be checked for compliance. For example, as an email with a document as an attachment is sent, the email client may verify that the sender has the authority to send the document, that the document itself is not restricted from being sent, and that the receiver is authorized to receive the document. For receivers that are outside of an organization, the receiving device may be separately registered and may be given full access or limited access (e.g., project based access, subject matter based access, etc.) as necessary and/or desired.

A script may be attached to the file that controls future distribution of the file.

In one embodiment, local communication among devices may be used for voting or approval of documents, transactions, business plans, etc. For example, in a meeting, the transaction process/approval chain may be present and each member's device may be verified. Each member may then indicate his or her approval of the documents, transactions, business plans, etc. The approval may be received on a hierarchical basis, or it may be received in any order.

Figure 1:
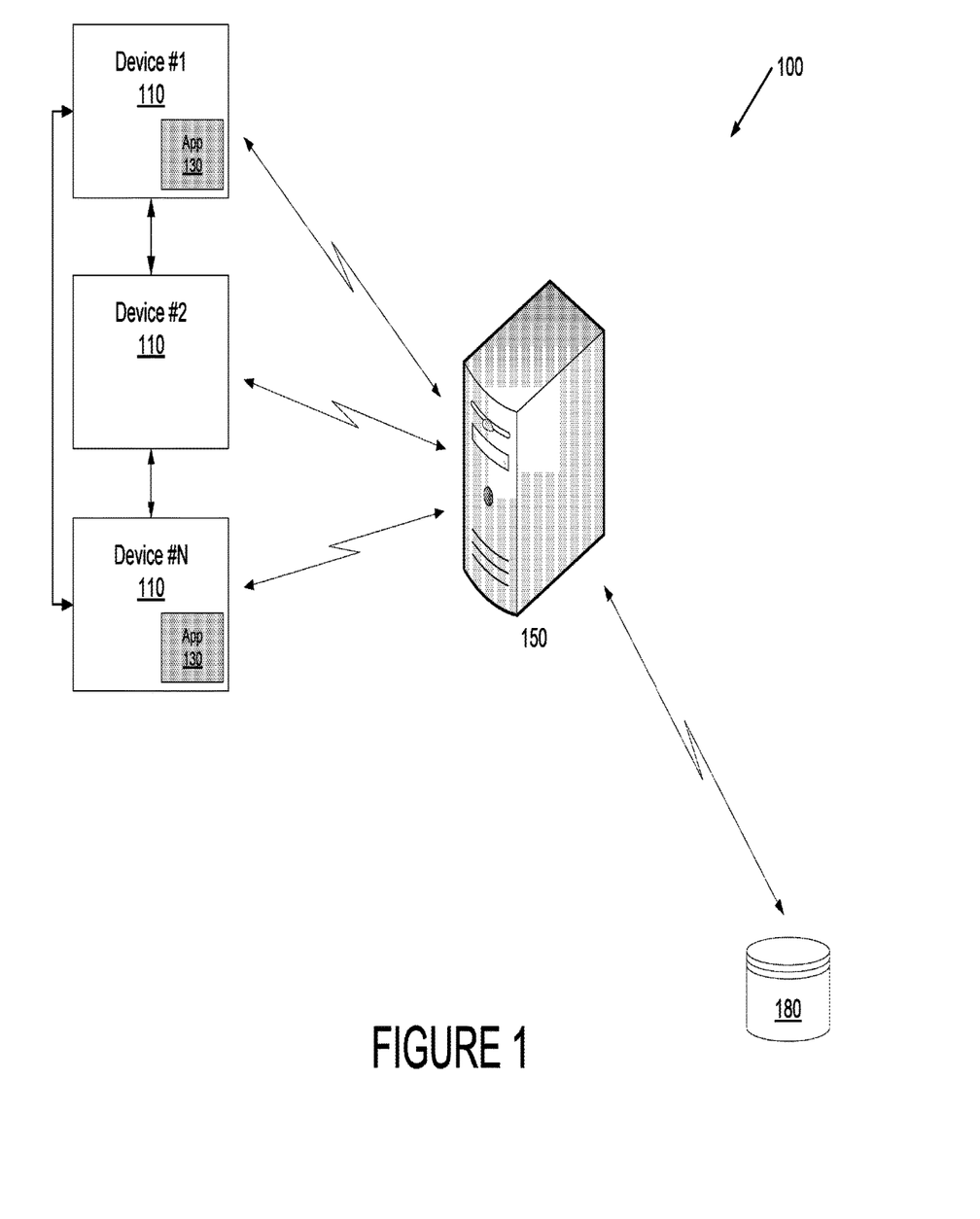
FIG. 1 is a block diagram of a system for data sharing and transaction processing for high security documents according to one embodiment.

Referring to FIG. 1, a block diagram of a system for data sharing and transaction processing for high security documents according to one embodiment is provided. System 100 may include electronic devices 110, server 150, and database 150. In one embodiment, electronic devices 110 may be any suitable electronic device, including, for example, desktop computers, workstations, notebook computers, laptop computers, computer terminals, videoconferencing terminals, table computers, smartphones, e-reading devices, etc. Electronic devices 110 may communicate with server 150 using an suitable network (e.g., Internet, intranet, virtual private network, etc.). Electronic devices 110 may further communicate with other electronic devices 110 directly using RF communication, such as near field communication (NFC), Bluetooth, by RF communication, by wired communication, etc.

In one embodiment, electronic device 110 may include software application or program 130 that is executed by electronic device 110. In another embodiment, electronic device 110 may not include software application 130. Software application 130 may control access to a document that may be stored locally on electronic device 130 or in database 180. It may also control the transmission of the document from a first electronic device 110 to a second electronic device 110 directly or indirectly, for example, through a mail server. In one embodiment, server 150 may include a module that manages file transfer data, the privileges for each user, registration information for each electronic device 110, dynamic restriction information, and category based file transfer policies. In one embodiment, this data may be stored in database 180.

Although only one database 180 is depicted in FIG. 1, it should be understood that multiple databases may be provided. For example, documents may be stored in one database, user privilege information may be stored in another database, etc.

In one embodiment, server 150 may executed a software application or program (not shown) that may perform some or all of the checks for devices 110.

In one embodiment, electronic device 110 and server 150 may interact in a coordinated fashion. The mobile components may reside on electronic devices 110 and may control and guide the process of sharing documents and collaborating on documents through communication channels, such as near field communication, Bluetooth, etc. in an ad-hoc fashion or by coordinating with the back-end.

Figure 2:
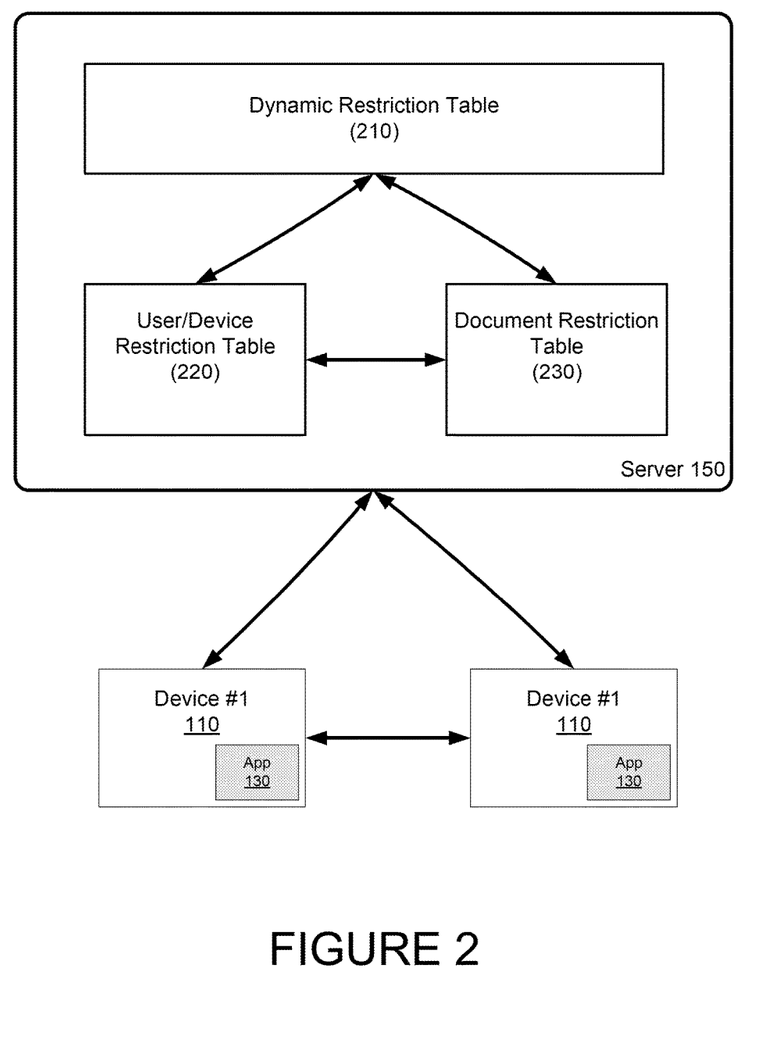
FIG. 2 is a schematic document of a server for use in the system for data sharing and transaction processing for high security documents according to one embodiment.

Referring to FIG. 2, an example of a server according to one embodiment is provided. Server 150 may include category-based dynamic restriction table 210, user/device restriction table 220, and document restriction table 230. In one embodiment, category-based dynamic restriction table 210 may check the category of the document in order to determine if there are restrictions on the category of the document. For example, for a banking document, a restriction may be in place that prohibits the sharing of the document until a deal is completed. In another embodiment, matrix-like restrictions that prohibit a document from Group A from being shared with Group B may be in place. Other category-based restrictions may be used as necessary and/or desired.

In another embodiment, the controller may regulate or restrict the communication between devices based on the user's profiles instead of document profiles. For example, if a group of users are in involved in a deal, the communication may be restricted to other groups that should not be aware of such data.

In general, if the document falls within the category-based dynamic restriction table, the software application on the server and/or the electronic device may restrict that document from being accessed and/or being shared with another electronic device.

In one embodiment, the category-based dynamic restriction table may be based on input from document authors, managers, organization policies, etc. In one embodiment, the category restrictions may be imposed by banking regulations, laws or other guidelines.

User/device restriction table 220 may check the authority of the user and/or electronic device to access and/or transfer a document. In one embodiment, at least two checks may be performed. The first check is to verify that the user that is attempting (or is requesting) to send the document is authorized to access and/or send the document. Thus, a sender who is not authorized to access a file is not allowed to send the document.

The second check is to verify that the receiving user is authorized to access and/or receive the document. Thus, a receiver who is not authorized to access the document is not allowed to receive the document.

In addition, device restrictions may be considered. For example, certain documents may not be transferred to personal electronic devices (e.g., devices that are not owned or controlled by the organization), but may be transferred to electronic devices that are owned or controlled by the organization.

In another embodiment, the authentication and security levels of the device and set up may guide the restrictions. For example, some documents may not be transferred to devices with multi-factor authentication, or digital certificates, or the user is not authorized using high security biometrics authentication, etc.

In one embodiment, the user and/or device restrictions may be based on input from document authors, managers, organization policies, laws, regulations, guidelines, etc. Any other user and/or device restrictions may be used as necessary and/or desired.

Document restriction table 230 may identify specific restrictions on the document itself. For example, a document may be marked with certain restrictions, such as restrictions on sharing, re-sharing, retention, editing, etc. In one embodiment, document restriction table 230 may specify an expiration date for the document. For example, after a certain amount of time, on a specific date/time, etc. the document may be automatically deleted or made inaccessible.

In one embodiment, the document restrictions may be based on input from document authors, managers, organization policies, etc. Any suitable restrictions on the document itself may be used as necessary and/or desired.

In one embodiment, both the user and the device checks must be satisfied before a document may be transferred.

In one embodiments, exceptions may be applied wherein a document or document may still be transferred/exchanged despite user and/or device restrictions. For example, an assistant may be authorized to transfer/exchange a document on behalf of another user even if that assistant would otherwise not be authorized to do so.

Figure 3:
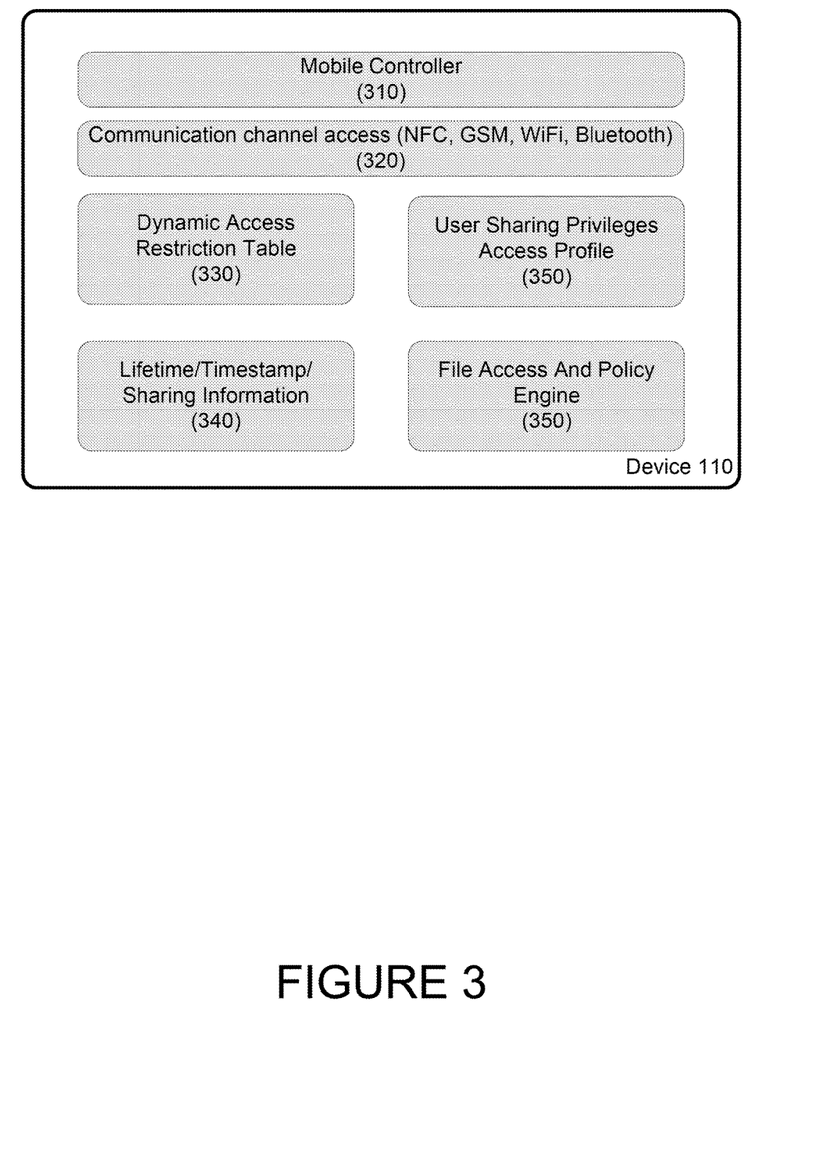
FIG. 3 is a schematic document of a device for use in the system for data sharing and transaction processing for high security documents according to one embodiment.

FIG. 3 depicts a block diagram of an electronic device according to one embodiment. Electronic device 110 may include mobile controller 310, communication channel access 320, dynamic access restriction table 330, lifetime/timestamp/sharing information 340, user sharing privileged access profile 350, and file access/policy engine 360.

In one embodiment, mobile controller 310 may control communication through any suitable communication channel, including NFC, WiFi, Bluetooth, IR, wired, etc. with respect to the document restrictions.

Communication channel access 320 provides access to the communication channel for accessing/sending/receiving a document.

Dynamic access restriction table 330 may be coordinated, or synchronized, with the server-side dynamic access restriction table 210. In one embodiment, device 110 and server 150 may maintain slightly different versions of a dynamic access restriction table that may differ based on the size and caching level of the mobile device. Dynamic restriction table 210 may be a more comprehensive table than dynamic restriction table 330. Moreover, dynamic restriction table 210 may be synchronized with other devices 110, entities, etc., in contrast to dynamic access restriction table 330 that exists on electronic device 110 and may only be updated for each transaction request.

In addition, dynamic access restriction table 330 on electronic device 110 may specific to a single user only (e.g., the user of the device) or to mobile device 110 itself.

Lifetime/timestamp/sharing information 640 may specify the length of activity for a communication channel, re-sharing of documents, auto deletion of documents/files that are received, etc.

User sharing privileges access profile 650 may specify the projects to which the user is assigned, documents owned/authored by the user, sharing privileges, groups to which the user belongs, registered meeting groups, etc.

File access and policy engine may determine policies for each document and/or document type based on criticality, project information, etc.

Figure 4:
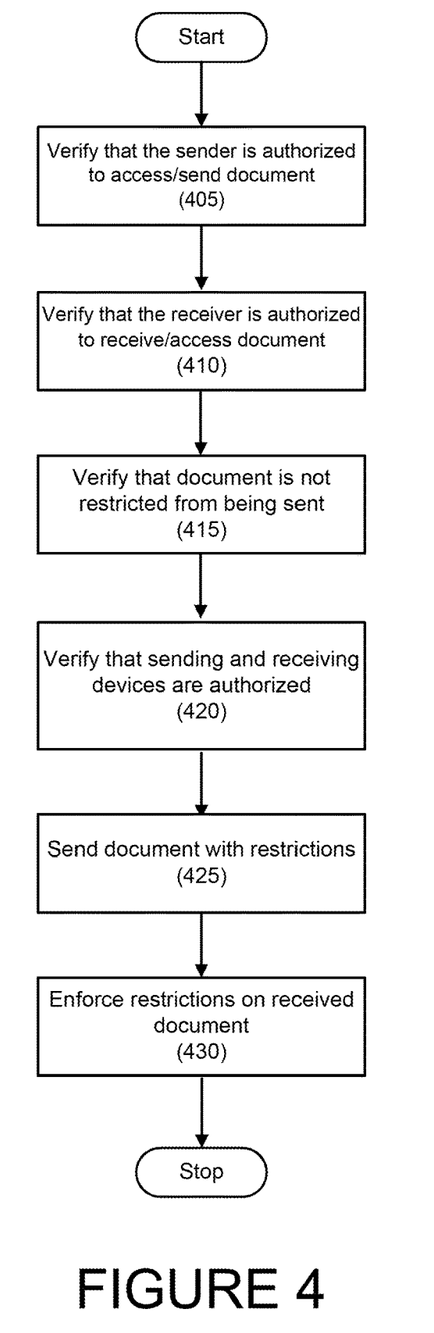
FIG. 4 is a flowchart depicting a method of data sharing for high security documents according to one embodiment.

Referring now to FIG. 4, a flowchart depicting a method of data sharing for high security documents according to one embodiment is provided.

In step 405, the server and/or a software application on the sending device may verify that the sender is authorized to access the document and to send the document.

In step 410, the server and/or a software application on the sending device may verify that the receiver is authorized to receive the document and access the document. In one embodiment, a software application on the receiving device may further verify this authorization.

In step 415, the server, the software application on the sending device and/or the software application on the receiving device may verify that the document is not restricted from being sent from the sender to the receiver.

In step 420, the server may verify that the sender and receiver devices are authorized to send/receive the document. In one embodiment, this may depend on the document size, document type, document security, physical location of the device, etc.

In step 425, the document may be sent to the receiving device with restrictions. In one embodiment, the document may be sent directly from the sending device to the receiving device by, for example, RF communication (e.g., NFC, Bluetooth, WiFi, etc.), IR communication, wire, etc. In another embodiment, the document may be sent by the server from a database.

In step 430, the server and/or the software application on the receiving device may enforce restrictions on document. For example, the server and/or the software application may prevent the document from being re-sent, printed, accessed after a passage of time or outside of a particular geographical area (e.g., the document cannot be accessed outside the office), may delete the document after a time period, etc.

In one embodiment, the checks on the sender, receiver, and document may be conducted in advance of a meeting. For example, when a user drafts a meeting invite with an attached document, the system may verify the authority of the sender to send the document, the authority of the receiver to receive the document, and any restrictions on the document itself.

In one embodiment, groups of individuals may be pre-certified to exchange documents with one another. For example, users within the same project may be pre-certified to exchange documents that relate to the project. As another example, users that have the same authority level (e.g., job title) may be pre-certified to exchange documents. The pre-certification requirements may be defined as necessary and/or desired.

In one embodiment, users may be approved for temporary pre-certification for certain documents.

In one embodiment, hard-coded or fixed rules that apply to the user's position, department, assignments, etc. may be considered. Such rules may be maintained in the back-end server side component of the system and a cached component may be maintained on the electronic device.

Figure 5:
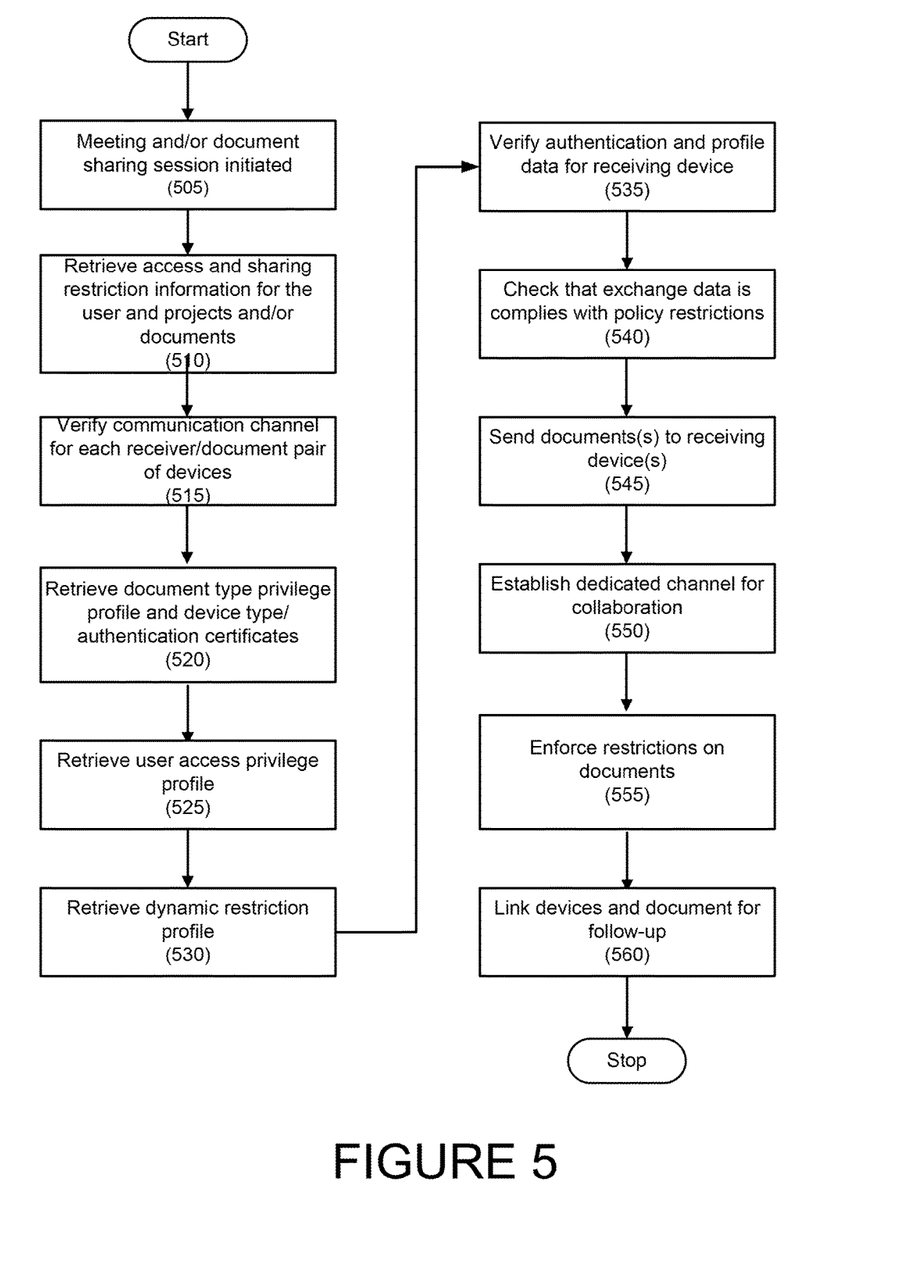
FIG. 5 is a flowchart depicting a method of data sharing for high security documents according to one embodiment.

Referring to FIG. 5, a flowchart depicting a method of data sharing for high security documents according to another embodiment is provided.

In step 505, a meeting and/or document sharing session may be initiated. In one embodiment, the session may be initiated on a mobile device. In another embodiment, the session may be initiated by a calendar entry. Any suitable way of initiating a session may be used as necessary and/or desired.

In step 510, access and sharing restriction information for user and projects/documents may be retrieved. For example, the user may be prohibited from sending any documents based on the user's position, projects, etc. In another embodiment, the user may be permitted to send documents within the organization, but prohibited from sending documents outside the organization. In one embodiment, the restriction information may be retrieved from at least one database. In another embodiment, the restriction information may be stored locally on the user's electronic device.

In step 515, the communication channel for each receiver/document pair of devices is verified. In one embodiment, this may include establishing a communication channel between a pair of devices, verifying that the device type, certificates, etc. for each device are valid, and verifying that the users have been authenticated. In one embodiment, the user/device restriction table may be accessed to verify this information.

In step 520, the device access privilege profile and device type/authentication certificates may be retrieved. In one embodiment, this data may be stored in a database and/or on the electronic device.

In step 525, the user access privilege profile may be retrieved. This profile may identify the documents that the user may access, share, etc.

In step 530, the dynamic restriction profile may be retrieved. In one embodiment, the dynamic restriction profile may identify restrictions on users, documents, etc. that may change. For example, certain documents may have additional restrictions until after a certain event, such as a deal closing, etc. Thus, until that event, sharing of the document may be prohibited.

In step 535, the authentication and profile data for receiver may be verified. In one embodiment, this may include verifying that the user of the receiving device is authenticated. In one embodiment, this may involve providing authenticating information, such as a username and password, RSA token data, biometric data, etc. In one embodiment, the amount of authentication required may depend on the sensitivity of the document to be provided.

In step 540, any policy restrictions may be checked. In one embodiment, this may include checking organizational policies that may restrict the transmission of the document.

In step 545, the document(s) may be sent to the receiving device. This may be sent by in any suitable way, including wirelessly (e.g., NFC, Bluetooth, WiFi, Apple's AirDrop, IR, etc.), over a network, by wire, etc.

In step 550, a dedicated channel for collaboration may be established. In one embodiment, multiple devices may be "tethered" and the future interactions may not require the full steps as in the first stage of channel generation. In another embodiment, certain documents may not be shared without going through the complete process.

In step 555, restrictions on the documents on the receiving device may be enforced. In one embodiment, the software application on the receiving device may enforce restrictions that prevent the document from being further shared, accessed, etc. and may automatically delete or make the document inaccessible after a predetermined event or passage of time.

In one embodiment, any restrictions may be lifted after the passage of time, the occurrence of an event (e.g., a deal is closed), etc.

In step 560, the sending, receiving devices and the document(s) may be linked for further collaboration. In one embodiment, this may include storing user, device and/or connection data to reduce the process for subsequent connections. The connectivity authorization between the users may not be checked every single time (unless there is a user change, device change, etc.). For example, although document checks may still be required, user and/or device checks may be skipped.

Similarly, in one embodiment, connectivity authorizations may not need to be checked every time for the same set of documents and revised versions of such documents.

In one embodiment, the linking may expire after the passage of a predetermined amount of time, after the occurrence of an event, by one of the participants, etc.

Figure 6:
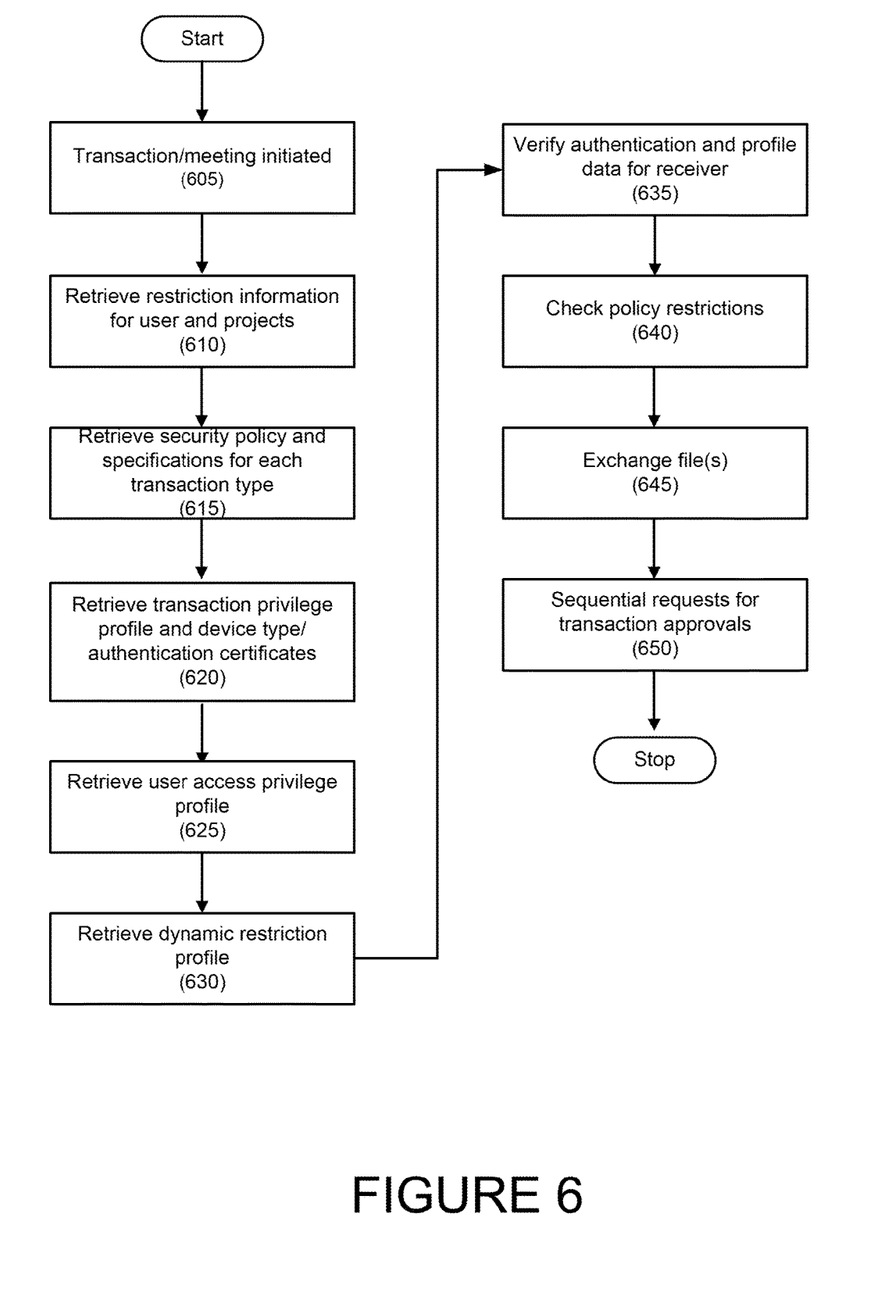
FIG. 6 is a flowchart depicting a method of transaction processing for high security documents according to one embodiment.

Referring to FIG. 6, a flowchart depicting a method of transaction processing for high security documents according to one embodiment is provided.

In step 605, a transaction and/or meeting session may be initiated.

In step 610, restriction information for user and projects may be retrieved. For example, the user may be prohibited from communication with others on certain projects based on the user's position, the project, etc. In another embodiment, transactions may be kept confidential from other users.

In step 615, the communication channel for each receiver/document pair of devices may be verified. In one embodiment, this may include establishing a communication channel between a pair of devices, verifying that the device type, certificates, etc. for each device are valid, and verifying that the users have been authenticated. In one embodiment, the user/device restriction table may be accessed to verify this information.

In step 620, file access privilege profile and device type/authentication certificates may be retrieved. In one embodiment, this data may be stored in a database and/or on the electronic device.

In step 625, user access privilege profile may be retrieved. In one embodiment, this may identify projects that the user may access.

In step 630, a dynamic restriction profile may be retrieved In one embodiment, the dynamic restriction profile may identify restrictions on users, documents, etc. that may change. For example, certain documents may have additional restrictions until after a certain event, such as a deal closing, etc. Thus, until that event, sharing of the document may be prohibited.

In step 635, authentication and profile data for the document receiver may be verified. In one embodiment, this may include verifying that the user of the receiving device is authenticated. In one embodiment, this may involve providing authenticating information, such as a username and password, RSA token data, biometric data, etc. In one embodiment, the amount of authentication required may depend on the sensitivity of the document to be provided.

In step 640, policy restrictions may be checked. In one embodiment, this may include checking organizational policies that may restrict communication regarding the transaction and/or project.

In step 645, if necessary, any files, documents, etc. may be sent from the sender to the receiver as necessary and/or desired.

In step 650, sequential requests for approval of the transaction and/or project may be provided. In one embodiment, the sequence may follow an approval chain. In another embodiment, approval requests may be provided to multiple individuals at the same time. In one embodiment, the requests are coordinated with a back-end server.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for transaction approval, comprising:
   receiving, at a first electronic device, a request for approval of a transaction, the request identifying the transaction and a plurality of approvers in an approval hierarchy;
   at least one computer processor at the first electronic device establishing a first communication link with a second electronic device;
   the at least one computer processor at the first electronic device sending the request for approval to the second electronic device over the first communication link;
   the at least one computer processor at the first electronic device receiving approval from the second electronic device;
   the at least one computer processor at the first electronic device establishing a second communication link with a third electronic device;
   the at least one computer processor at the first electronic device sending the request for approval to the third electronic device over the second communication link;
   the at least one computer processor at the first electronic device receiving approval from the third electronic device;
   the at least one computer processor at the first electronic device requesting authorization from a document management server to send an electronic document associated with the transaction to at least one of the second electronic device and the third electronic device;
   the at least one computer processor at the first electronic device receiving authorization from the document management server to send the electronic document to at least one of the second electronic device and the third electronic device; and
   the at least one computer processor at the first electronic device sending the electronic document with at least one dynamic receiver authentication restriction to at least one of the second electronic device and the third electronic device, the at least one dynamic receiver authentication restriction changing from a first receiver authentication level to a second receiver authentication level based on an event.

2. The method of claim 1, wherein the first communication link and the second communication link are the same communication link.

3. The method of claim 1, wherein the second electronic device is associated with an approver at a first level in the approver hierarchy.

4. The method of claim 3, wherein the third electronic device is associated with an approver at a second level in the approver hierarchy.

5. The method of claim 3, wherein the request for approval to the second electronic device and the request for approval to the third electronic device are communicated sequentially.

6. The method of claim 3, wherein the request for approval to the second electronic device and the request for approval to the third electronic device are communicated simultaneously.

7. The method of claim 3, wherein the request for approval to the second electronic device and the request for approval to the third electronic device are coordinated with a back-end server.

8. The method of claim 1, further comprising:
   the at least one computer processor at the first electronic device receiving at least one dynamic receiver authentication restriction to associate with the electronic document; and
   the at least one computer processor associating the at least one dynamic receiver authentication restriction with the electronic document.

9. The method of claim 1, wherein the event is completion of the transaction.

10. The method of claim 1, wherein the event is based on the passage of time.

11. A method for transaction approval, comprising:
    receiving, at a server comprising a computer processor, a request for approval of a transaction from a first electronic device, the request identifying the transaction and a plurality of approvers in an approval hierarchy;
    at least one computer processor at the server establishing a first communication link with a second electronic device;
    the at least one computer processor at the server sending the request for approval to the second electronic device over the first communication link;
    the at least one computer processor at the server receiving approval from the second electronic device;
    the at least one computer processor at the server establishing a second communication link with a third electronic device;
    the at least one computer processor at the server sending the request for approval to the third electronic device over the second communication link;
    the at least one computer processor at the server receiving approval from the third electronic device;
    the at least one computer processor at the server communicating the approval from the third electronic device and the approval from the third electronic device to the first electronic device;
    the at least one computer processor at a document management server receiving an identification of an electronic document associated with the transaction to at least one of the second electronic device and the third electronic device;
    based on the identification of the electronic document and the identification of the first electronic device, the at least one computer processor at the document management server verifying that a sender of the electronic document is authorized to send the electronic document;
    based on the identification of the electronic document and the identification of the receiver, the at least one computer processor at the document management server verifying that at least one of the second electronic device and the third electronic device is authorized to receive the electronic document;
    the at least one computer processor at the document management server identifying at least one dynamic receiver authentication restriction to associate with the electronic document, the at least one dynamic receiver authentication restriction changing from a first receiver authentication level to a second receiver authentication level based on an event;

the at least one computer processor at the document management server associating the at least one dynamic restriction with the electronic document; and the at least one computer processor at the document management server sending the electronic document with the at least one dynamic receiver authentication restriction to at least one of the second electronic device and the third electronic device.

12. The method of claim 11, wherein the first communication link and the second communication link are the same communication link.

13. The method of claim 11, wherein the second electronic device is associated with an approver at a first level in the approver hierarchy.

14. The method of claim 11, wherein the third electronic device is associated with an approver at a second level in the approver hierarchy.

15. The method of claim 11, wherein the request for approval to the second electronic device and the request for approval to the third electronic device are communicated sequentially.

16. The method of claim 11, wherein the request for approval to the second electronic device and the request for approval to the third electronic device are communicated simultaneously.

17. The method of claim 11, further comprising:

the at least one computer processor at the document management server receiving at least one dynamic receiver authentication restriction to associate with the electronic document; and the at least one computer processor at the document management server associating the at least one dynamic receiver authentication restriction with the electronic document.

18. The method of claim 11, wherein the event is based on the passage of time.

\* \* \* \* \*